(12) United States Patent
Ferris et al.

(10) Patent No.: US 6,493,169 B1
(45) Date of Patent: Dec. 10, 2002

(54) DISK DRIVE EMPLOYING SPINDLE MOTOR COMMUTATION TIME VARIATION FOR REDUCING ACOUSTIC NOISE

(75) Inventors: Timothy A. Ferris, Lake Forest, CA (US); Raffi Codilian, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 09/551,925

(22) Filed: Apr. 19, 2000

(51) Int. Cl.$^7$ .............................................. G11B 15/46
(52) U.S. Cl. ................................. 360/73.03; 360/98.07
(58) Field of Search .......................... 360/73.03, 98.07, 360/99.04, 99.08, 51, 97.01, 78.07; 318/254, 375, 439, 599

(56) References Cited

U.S. PATENT DOCUMENTS

| | | | | |
|---|---|---|---|---|
| 5,625,511 A | * | 4/1997 | Brooks et al. | 508/289 |
| 5,886,489 A | * | 3/1999 | Rowan et al. | 318/439 |
| 5,986,426 A | * | 11/1999 | Rowan | 318/599 |
| 6,104,153 A | * | 8/2000 | Codilian et al. | 318/362 |
| 6,160,368 A | * | 12/2000 | Plutowski | 318/375 |
| 6,178,060 B1 | * | 1/2001 | Liu | 360/78.07 |
| 6,215,266 B1 | * | 4/2001 | Goh et al. | 318/439 |
| 6,236,174 B1 | * | 5/2001 | White | 318/254 |
| 6,252,362 B1 | * | 6/2001 | White et al. | 318/254 |
| 6,288,866 B1 | * | 9/2001 | Butler et al. | 360/97.01 |
| 6,323,610 B1 | * | 11/2001 | Ng et al. | 318/254 |

* cited by examiner

Primary Examiner—David Hudspeth
Assistant Examiner—Fred F. Tzeng
(74) Attorney, Agent, or Firm—Milad G. Shara, Esq.; Howard H. Sheerin, Esq.

(57) ABSTRACT

A disk drive incidentally generates undesirable acoustic noise during an operation mode and includes a spindle motor having windings and a rotor rotatable at an operating spin-rate during the operation mode. A commutation state sequencer includes a sequence of commutation states including a present commutation state and a next commutation state for generating a sequence of control signals. Switching elements are responsive to the sequence of control signals for sequentially applying a voltage across a selected combination of the windings to generate a torque on the rotor in order to maintain the operating spin-rate. A spindle motor control system provides a series of commutation clock pulses having a corresponding series of commutation clock periods to advance the commutation state sequencer from the present commutation state to the next commutation state. At least two of the commutation clock periods each have a systematically introduced variation from a nominal commutation clock period that depends on the operating spin-rate. The systematically introduced variation reduces the acoustic noise in the disk drive.

16 Claims, 6 Drawing Sheets

DISK DRIVE EMPLOYING SPINDLE MOTOR COMMUTATION TIME VARIATION FOR REDUCING ACOUSTIC NOISE

BACKGROUND OF THE INVENTION

1. Field of the Invention

The present invention generally relates to reducing undesirable acoustic noise generated by a hard disk drive. More particularly, the present invention relates to a disk drive employing spindle motor commutation time variation for reducing acoustic noise in the disk drive.

2. Description of the Prior Art

In hard disk drives, data is stored on magnetic media disks, which are typically stacked on a spindle assemble. The spindle assembly is mechanically coupled to a spindle motor which rotates the disks at a substantially constant operating spin-rate during an operating mode of the disk drive.

A typical three-phase spindle motor includes a stator having three windings and a rotor. The rotor has magnets that provide a permanent magnet field. The spindle motor can generate torque on the rotor when current flows through at least one of the windings. The torque depends on the magnitude and direction of current flow through the windings and an angular position of the rotor relative to the stator. The functional relationship between torque and current flow and angular position is commonly depicted in a set of torque curves, each of which corresponds to a respective one of a series of commutation states.

A spindle motor driver typically drives the spindle motor. The spindle motor driver includes a commutation state sequencer having a sequence of commutation states for generating a sequence of control signals. The spindle motor driver also includes switching elements which are responsive to the sequence of control signals for sequentially applying a voltage across the selected combinations of the windings of the spindle motor to generate positive torque on the rotor to maintain the operating spin-rate. A spindle motor control system provides a series of commutation clock pulses to advance the commutation state sequencer from a present commutation state to a next commutation state. The series of commutation clock pulses have a corresponding series of commutation clock periods. In conventional disk drives, the commutation clock periods each have a nominal commutation clock period that depends on the operating spin-rate. The nominal commutation clock period produced by the conventional spindle motor control system cause the spindle motor to be commutated at fixed time intervals.

Typical disk drives produce acoustic noise to a large extent from mechanically induced vibrations. Some portion of the acoustic noise produced in the disk drive is from electro-magnetically induced vibrations. The electro-magnetically induced vibrations occur mainly at harmonics of the spindle motor fixed commutation frequency resulting from the nominal commutation clock period. The spindle motor commutation fixed time intervals provide for reliable detection of back electromotive force (BEMF) zero crossings, and provide for the spindle motor to be synchronously operated at the proper nominal commutation frequency. The conventional spindle motor control system produces spindle motor commutation harmonics occurring at fixed frequencies. The commutation harmonics occurring at fixed frequencies cause narrow peaks in the acoustic spectrum known as prominent tones. The prominent tones can be audible and can potentially violate disk drive acoustic noise specifications.

There exists substantial competitive pressure to develop mass-market hard disk drives having reduced acoustic noise. For the reasons stated above, there is a need to reduce undesirable acoustic noise generated by a hard disk drive, especially the acoustic noise produced from electro-magnetically induced vibrations occurring mainly at harmonics of the spindle motor commutation frequency.

SUMMARY OF THE INVENTION

The invention can be regarded as a disk drive that incidentally generates undesirable acoustic noise during an operation mode. The disk drive includes a spindle motor, switching elements, a commutation state sequencer, and a spindle motor control system. The spindle motor has a plurality of windings and a rotor rotatable at an operating spin-rate during the operation mode of the disk drive. The commutation state sequencer includes a sequence of commutation states for generating a sequence of control signals. The sequence of commutation states includes a present commutation state and a next commutation state. The switching elements are responsive to the sequence of control signals for sequentially applying a voltage across a selected combination of the windings to generate a torque on the rotor in order to maintain, the operating spin-rate. The spindle motor control system provides a series of commutation clock pulses to advance the commutation state sequencer from the present commutation state to the next commutation state. The series of commutation clock pulses have a corresponding series of commutation clock periods. At least two of the commutation clock periods each have a systematically introduced variation from a nominal commutation clock period that depends on the operating spin-rate. The systematically introduced variation for each of the at least two commutation clock periods reduces the acoustic noise in the disk drive.

The invention can also be regarded as a method of reducing acoustic noise in a disk drive that incidentally generates undesirable acoustic noise during an operation mode. The disk drive includes a spindle motor having a plurality of windings and a rotor rotatable at an operating spin-rate during the operation mode of the disk drive; and a spindle motor driver having switching elements. The method includes providing a sequence of commutation states for generating a sequence of control signals. The sequence of commutation states include a present commutation state and a next commutation state. The method also includes controlling the switching elements with the sequence of control signals to sequentially apply a voltage across a selected combination of the windings to generate a torque on the rotor in order to maintain the operating spin-rate. The method also includes providing a series of commutation clock pulses to advance the sequence of commutation states from the present commutation state to the next commutation state. The series of commutation clock pulses have a corresponding series of commutation clock periods. The method also includes systematically introducing variation from a nominal commutation clock period that depends on the operating spin-rate into each of at least two of the commutation clock periods to reduce the acoustic noise in the disk drive.

DESCRIPTION OF THE PREFERRED EMBODIMENTS

Figure 1:
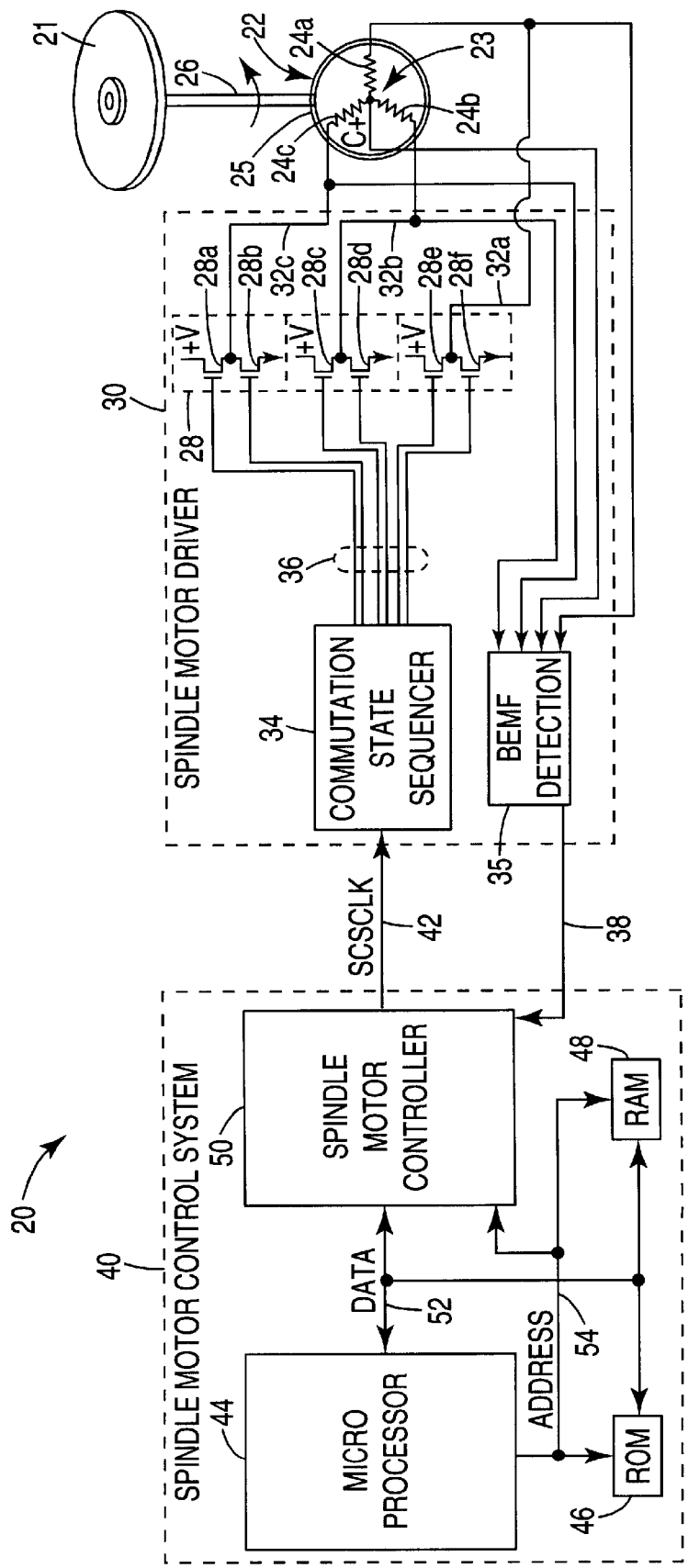
FIG. 1 is a block and schematic diagram of a hard disk drive according to an embodiment of the present invention.

Referring to FIG. 1, a disk drive 20 according to an embodiment of the present invention employs a method of reducing undesirable acoustic noise generated by disk drive 20 during an operation mode of the disk drive by systematically introducing spindle motor commutation time variation.

FIG. 1 illustrates certain portions of disk drive 20 relevant to an embodiment of the present invention. A more detailed description of the overall operation and components of a disk drive is found in patent application Ser. No. 09/120,854 filed on Jul. 21, 1998, entitled, "DISK DRIVE EMPLOYING METHOD OF SPINNING DOWN ITS SPINDLE MOTOR TO REDUCE THE TIME REQUIRED FOR SUBSEQUENTLY SPINNING IT UP, and assigned to the assignee of the present application and which is herein incorporated by reference.

Disk drive 20 includes a suitable number of magnetic disks 21 stacked on a spindle assembly 26, a spindle motor 22, a spindle motor driver 30, and a spindle motor control system 40. Spindle motor 22 is mechanically coupled to spindle assembly 26 to cause disks 21 to rotate at a high spin-rate.

The embodiment of spindle motor 22 illustrated in FIG. 1 includes a stator 23 having three windings 24a (winding A), 24b (winding B), and 24c (winding C) electrically arranged in a Y configuration, and a rotor 25. In one exemplary embodiment, spindle motor 22 is implemented in an eight pole, three-phase DC brushless motor.

Figure 2A:
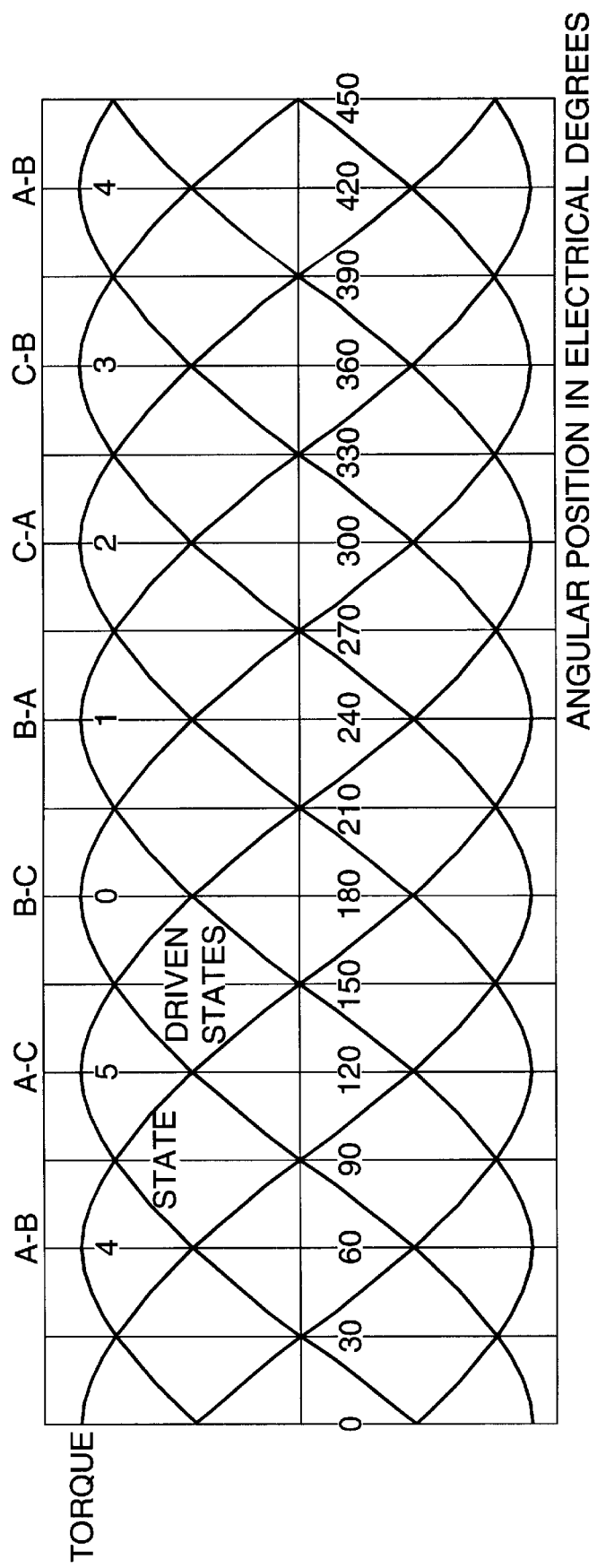
FIG. 2A is a diagram illustrating an example set of torque curves for a spindle motor of the hard disk of FIG. 1 which depict the functional relationship between torque, current flow, and angular position.

Rotor 25 has magnets that provide a permanent magnetic field. Spindle motor 22 generates torque ($T_d$) on rotor 25 when current ($I_m$) flows through at least one of the windings 24. $T_d$ depends upon the magnitude and direction of current flow through the windings 24, and the angular position of rotor 25 relative to stator 23. The functional relationship between torque and current flow and angular position is commonly depicted in a set of torque curves, each of which corresponds to a respective one of a series of commutation states. Such torque curves are illustrated in FIG. 2A and are described in more detail below.

Spindle motor driver 30 supplies current to windings 24 to cause rotor 25 to rotate at an operating spin-rate during the operation mode of disk drive 20. Spindle motor driver 30 includes switching elements 28 and commutation state sequencer 34. Commutation state sequencer 34 includes a sequence of commutation states for generating a sequence of control signals 36, which are coupled to switching elements 28. Switching elements 28 are responsive to the sequence of control signals 36 for sequentially applying a voltage +V across a selected combination of windings 24 to generate a torque on rotor 25 in order to maintain the operating spin-rate of rotor 25.

Spindle motor control system 40 provides a series of commutation clock pulses on SCSCLK line 42 to advance commutation state sequencer 34 from a present commutation state to a next commutation state. The series of commutation clock pulses on SCSCLK line 42 have a corresponding series of commutation clock periods. The commutation clock periods have a systematically introduced variation from a nominal commutation clock period that depends on the operating spin-rate of rotor 25. The systematically introduced variation reduces the acoustic noise in disk drive 20.

Spindle motor control system 40 includes a microprocessor 44, a read-only memory (ROM) 46, a writeable random access memory (RAM) 48, a spindle motor controller 50, a microprocessor data bus 52, and a microprocessor address bus 54.

Microprocessor 44 executes instructions acquired from a stored control program to control disk drive functions. These functions include starting up and controlling the speed of spindle motor 22 via spindle motor controller 50 and numerous other disk drive functions. Microprocessor 44 includes an I/O port connected to microprocessor data bus 52 and address bus 54.

Microprocessor 44 suitably includes an embedded ROM or other non-volatile memory, such as flash memory, that stores some of the control programs it uses. Here, control programs include the instructions microprocessor 44 executes, and tables, parameters or arguments used during the execution of these programs. Microprocessor control programs may also reside in any or all of ROM 46 or RAM 48. Microprocessor 34 suitable also includes a register set and a RAM.

ROM 46 is an optional conventional ROM IC that stores at least part of the control program used by microprocessor 44. ROM 46 may be omitted in an embodiment in which microprocessor 44 includes embedded ROM suitable for replacing the functions of ROM 46. Alternatively, ROM 46 is replaced by programmable non-volatile memory, such as flash memory.

RAM 48 is an optional conventional RAM IC used to enlarge the high speed writeable memory available to microprocessor 44. RAM 48 is suitably employed when microprocessor 44 lacks sufficient internal RAM.

Spindle motor controller 50 is connected to microprocessor data bus 52 and address bus 54 to permit microprocessor 44 to directly communicate with spindle motor controller 50. Microprocessor data bus 52 and address bus 54 also enable microprocessor 44 to communicate directly with ROM 46 and RAM 48. Write data is provided to and read data is provided from ROM 46 and RAM 48 from/to microprocessor data bus 52. Addresses are provided from microprocessor 44 to ROM 46 and RAM 48 for writing and reading data via microprocessor address bus 54.

Various firmware routines are stored in memory locations in ROM 46 for controlling the operation of spindle motor 22. For example, a programmable speed controller routine is stored in ROM 46 for controlling spindle motor 22 during the operation mode of disk drive 20. Microprocessor 44 preferably comprises a digital signal processor that runs the firmware routines to control spindle motor 22. Suitably, during the operation mode of disk drive 20, microprocessor 44 receives and executes speed controller instructions from the speed controller routine stored in ROM 46 to form a speed controller within microprocessor 44.

Spindle motor control system 40 includes microprocessor 44 and spindle motor controller 50 for commanding spindle motor driver 30 to apply the voltage +V across at least one winding of windings 24 to cause rotor 25 to rotate. Rotor 25 rotating induces a BEMF having a polarity across each of windings 24. Microprocessor 44 and spindle motor controller 50 can also subsequently command spindle motor driver 30 to remove the applied voltage +V from windings 24.

Spindle motor controller 50 provides the series of commutation clock pulses on SCSCLK line 42 to advance commutation state sequencer 34 from a present commutation state to a next commutation state. Thus, commutation state sequencer 34 increments its state with every new commutation clock pulse on SCSCLK line 42.

During the operation mode of disk drive 20, commutation state sequencer 34 sequences through a sequence of six commutation states corresponding to a set of torque curves to control switching elements 28 which drive spindle motor 22 to maximize the peak positive torque produced by spindle motor 22.

Each of six control signals 36 from commutation state sequencer 34 are coupled to a gate of a corresponding one of power metal oxide semiconductor field effect transistors (MOSFETs) 28a, 28b, 28c, 28d, 28e, and 28f. Power MOSFETs 28a–f form switching elements 28. Suitably, in an embodiment where all power MOSFETs 28a–f are implemented as N-channel MOSFETs, the drain of power MOSFET 28a is coupled to the positive power supply (i.e., voltage +V) and its source is coupled to winding 24c via a line 32c. Power MOSFET 28a is paired with power MOSFET 28b, which has its source coupled to ground and its drain coupled to winding 24c via line 32c. Similarly, power MOSFET 28c has its drain coupled to the voltage +V and its source coupled to winding 24b via a line 32b, and is paired with power MOSFET 28d which has its source coupled to ground and its drain coupled to winding 24b via line 32b. Power MOSFET 28e has its drain coupled to the voltage +V and its source coupled to winding 24a via a line 32a, and is paired with power MOSFET 28f which has its source coupled to ground and its drain coupled to winding 24a via line 32a.

Each power MOSFET pair (i.e., 28a–28b, 28c–28d, and 28e–28f) form a tri-state switching element. Each tri-state switching element 28 includes a pair of MOSFETs which are in one of three possible states as follows: 1) the upper MOSFET (e.g., 28a) is on and the lower MOSFET (e.g., 28b) is off to switch the +V voltage to the corresponding winding 24 connected to the switching element; 2) the upper MOSFET (e.g., 28a) is off and the lower MOSFET (e.g., 28b) is on to couple the corresponding winding 24 to ground; and the tri-state condition where the upper MOSFET (e.g., 28a) and the lower MOSFET (e.g., 28b) are both off, such that the terminal of the winding 24 connected to the tri-stated switching element floats and no current flows through that winding. If either of the pair of MOSFETs in a tri-state switching element 28 is conducting, the switching element is referred to as a driven switching element and the winding 24 connected to the driven switching element is referred to as a driven winding. If neither MOSFET in a tri-state switching element 28 is conducting, the switching element is referred to as a tri-stated switching element or undriven switching element and the winding 24 connected to the tri-stated switching element is a floating winding.

Suitably, commutation state sequencer 34 via control signals 36 switches on two power MOSFETs 28 on opposite legs of windings 24 during each of the commutation states, such as power MOSFET 28a and 28d. In this example, power MOSFET 128e and 128f are shut off so that no current flows through winding 24a, resulting in a floating winding. Thus, there is one floating winding for three-phase spindle motor 22 during each of the six commutation states.

In the operation mode of disk drive 20, microprocessor 44 serves as a speed controller to execute the speed controller routine out of ROM 46 and RAM 48 to control the spin-rate of spindle motor 22 to maintain a substantially constant spin-rate of disk 21. Commutation state sequencer 34 operates during the operation mode by responding to the series of commutation clock pulses on SCSCLK line 42 to sequence through commutation states to control which of power MOSFETs 28 are switched on and which are switched off so that peak positive torque is generated for rotor 25 of spindle motor 22.

Torque Curves

FIG. 2A illustrates a set of torque curves for spindle motor 22 which depict the functional relationship between torque and current flow and angular position. Each torque curve of the set of six torque curves corresponds to a respective one of the sequence of six commutation states of commutation state sequencer 34. As described above, during each of the six commutation states, two of windings 24 are driven while the third winding 24 is floating (i.e, undriven). The torque curves are illustrated in FIG. 2A relative to one cycle of each curve being 360 electrical degrees. The sequence of six commutation states are given in the following Table I.

TABLE I

| Commutation State | Driven Windings | Floating Winding |
|---|---|---|
| 0 | B-C | A |
| 1 | B-A | C |
| 2 | C-A | B |
| 3 | C-B | A |
| 4 | A-B | C |
| 5 | A-C | B |

As shown in FIG. 2A, from approximately 30° to 90°, peak positive torque is obtained by selecting commutation state AB. Similarly, peak positive torque is obtained by: selecting commutation state AC from approximately 90° to 150°; selecting commutation state BC from approximately 150° to 210°; selecting commutation state BA from approximately 210° to 270°; selecting commutation state CA from approximately 270° to 330°; and selecting commutation state CB from approximately 330° to 390°.

Figure 2B:
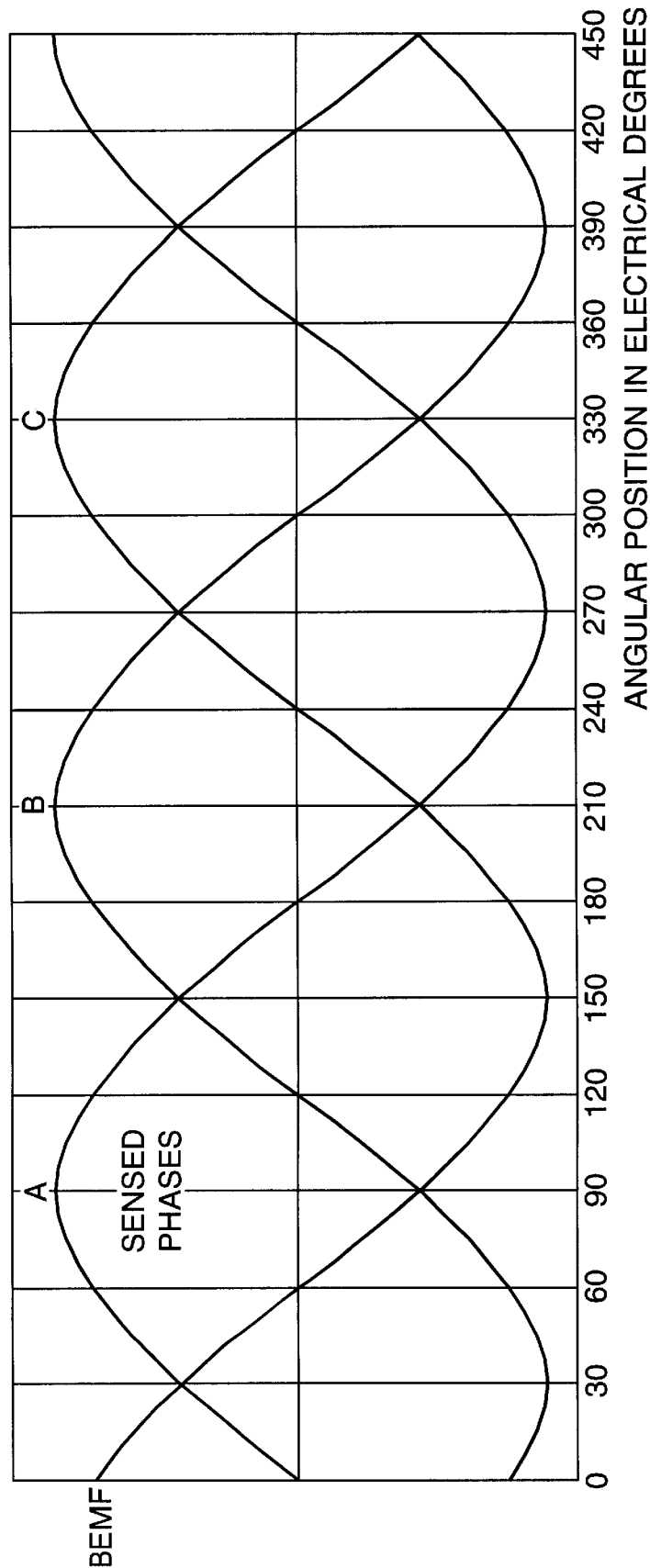
FIG. 2B is a diagram corresponding to FIG. 2A which plots the BEMF for each of the spindle motor windings versus the angular positions plotted in the torque curves of FIG. 2A.

FIG. 2B plots BEMF for each of spindle motor windings 24a (winding A), 24b (winding B), and 24c (winding C) versus electrical degrees corresponding to the electrical degrees of the torque curves of FIG. 2A. As illustrated in FIG. 1, winding 24a, winding 24b, winding 24c, and a center tap (C+) of spindle motor 22 are coupled to a BEMF direction circuit 35 which provides corresponding BEMF signals to spindle motor controller 50 via a line 38. As illustrated in FIG. 2B, when rotor 25 of spindle motor 22 is spinning in the forward spin-direction, the BEMF of Winding A has a negative to positive zero crossing at 0° and a positive to negative zero crossing at 180°. Winding B has a negative to positive zero crossing at 120° and a positive to negative zero crossing at 300°. Winding C has a positive to negative zero crossing at 60° and a negative to positive zero crossing at 240°.

Method for Reducing Acoustic Noise in Disk Drive

Figure 3:
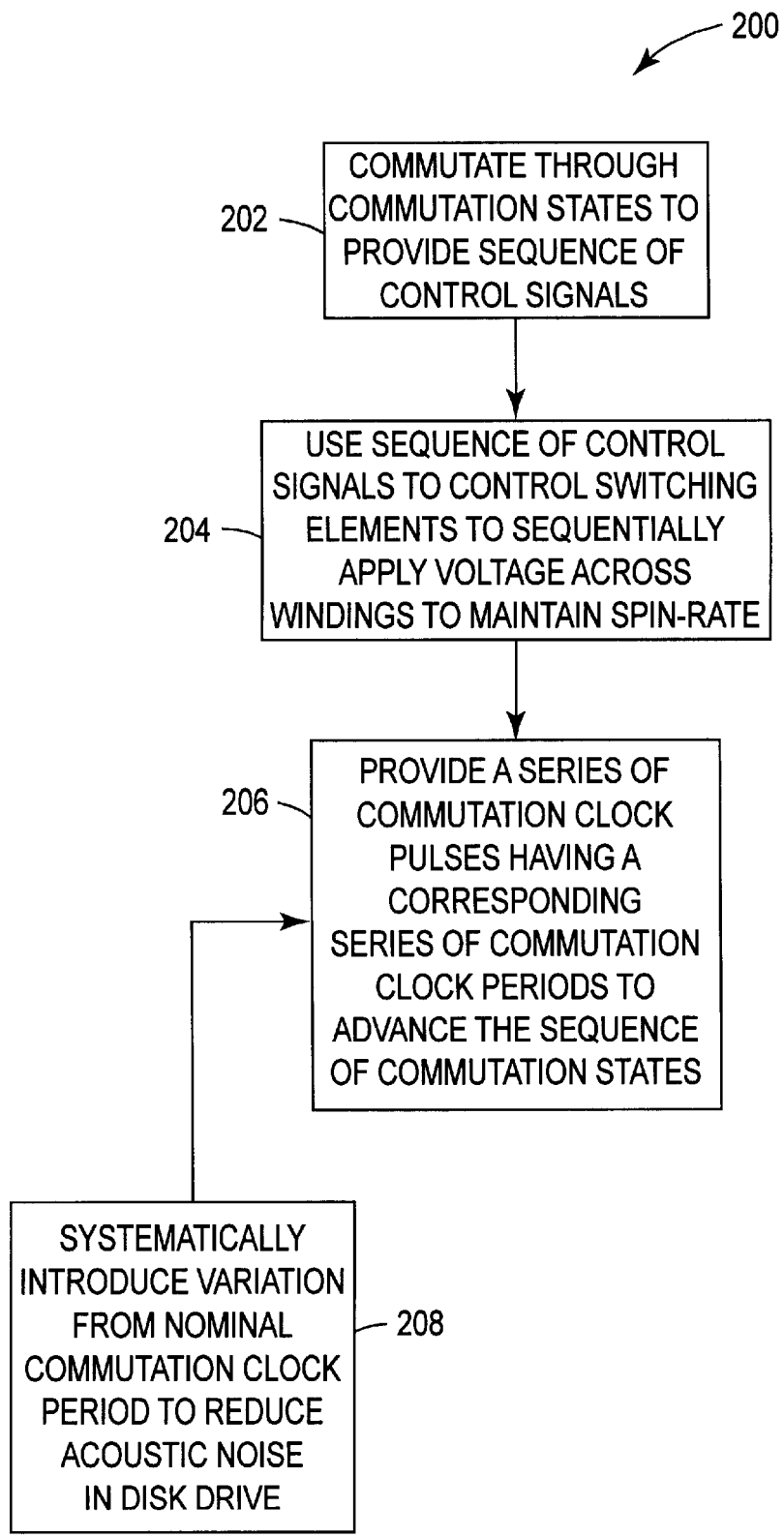
FIG. 3 is a block flow diagram illustrating a method of reducing acoustic noise in the hard disk drive of FIG. 1 by systematically introducing spindle motor commutation time variation to an operating spin-rate.

FIG. 3 illustrates a method generally indicated at 200 for reducing acoustic noise in a disk drive, such as disk drive 20 illustrated in FIG. 1, that incidentally generates undesirable acoustic noise during an operation mode of the disk drive.

As indicted at block 202, commutation state sequencer 34 commutates through a sequence of commutation states to provide the sequence of control signals 36. As indicated at block 204, the sequence of control signals 36 are used to control switching elements 28 to sequentially apply the voltage +V across a selected combination of windings 24 to generate a torque on rotor 25 in order to maintain the operating spin-rate of the rotor.

As indicated at block 206, spindle motor control system 40 via spindle motor controller 50 provides the series of commutation clock pulses on SCSCLK line 42 to advance commutation state sequencer 34 from a present commutation state to a next commutation state. The series of commutation clock pulses on (SCSCLK) line 42 have a corresponding series of commutation clock periods.

As indicated at block 208, spindle motor controller 50 systematically introduces variation from a nominal commutation clock period into the commutation clock periods. The nominal commutation clock period depends on the operating spin-rate of rotor 25. The systematically introduced variation into the commutation clock periods reduces the acoustic noise in disk drive 20.

The systematically introduced variation from the nominal commutation clock period causes spindle motor commutation time variation to thereby reduce acoustic noise in disk drive 20 by reducing the peaks in the acoustic spectrum. The spindle motor commutation time variation effectively smears harmonic frequencies so that the acoustic energy is not concentrated in a narrow frequency band.

In one embodiment, a suitable allowable speed variation of the spindle motor speed controller of microprocessor 44 is approximately 0.1 percent over one mechanical revolution of rotor 25. Therefore, the spindle motor commutation time variation for reducing acoustic noise in disk drive 20 is preferably made by multiple systematically introduced variations in commutation periods where the accumulation of the variations within a series of the variations is substantially zero. Each of the series of variations is preferably over an integer multiple of an electrical cycle, such as one electrical cycle, of spindle motor 22. In addition, the variations in each series preferably alternate between negative and positive polarity to substantially stay in the peak positive torque regions of spindle motor 22 to maximize the peak positive torque produced by spindle motor 22.

Microprocessor 44 executing the speed controller routine stored in ROM 46 controls the voltage +V applied across windings 24 in order to maintain the operating spin-rate of rotor 25 in response to the BEMF signals on line 38 from BEMF detection circuit 35. Spindle motor controller 50 monitors the time period between BEMF zero crossings and provides this time period information to microprocessor 44 which thereby determines speed error that is used for controlling the voltage +V applied across windings 24 to compensate for speed error. In one embodiment, the time period between BEMF zero crossings is monitored by spindle motor controller 50 once per mechanical revolution of rotor 25. In this embodiment, the percentage of systematically introduced variation is within speed error tolerance for each mechanical revolution. For example, in the embodiment where the speed error tolerance is approximately 0.1 percent, the accumulation of the variations in each series of variations is substantially zero for each electrical cycle of spindle motor 22 to thereby achieve substantially zero accumulation of the variations over one mechanical revolution of rotor 25 which is four electrical cycles of an example eight pole, three-phase spindle motor 22.

In one embodiment, the time for providing the series of commutation clock pulses on SCSCLK line 42 to advance commutation state sequencer 34 are adjusted in response to the BEMF signals on line 38 from BEMF detection circuit 35.

Spindle Motor Controller Embodiments

Figure 4:
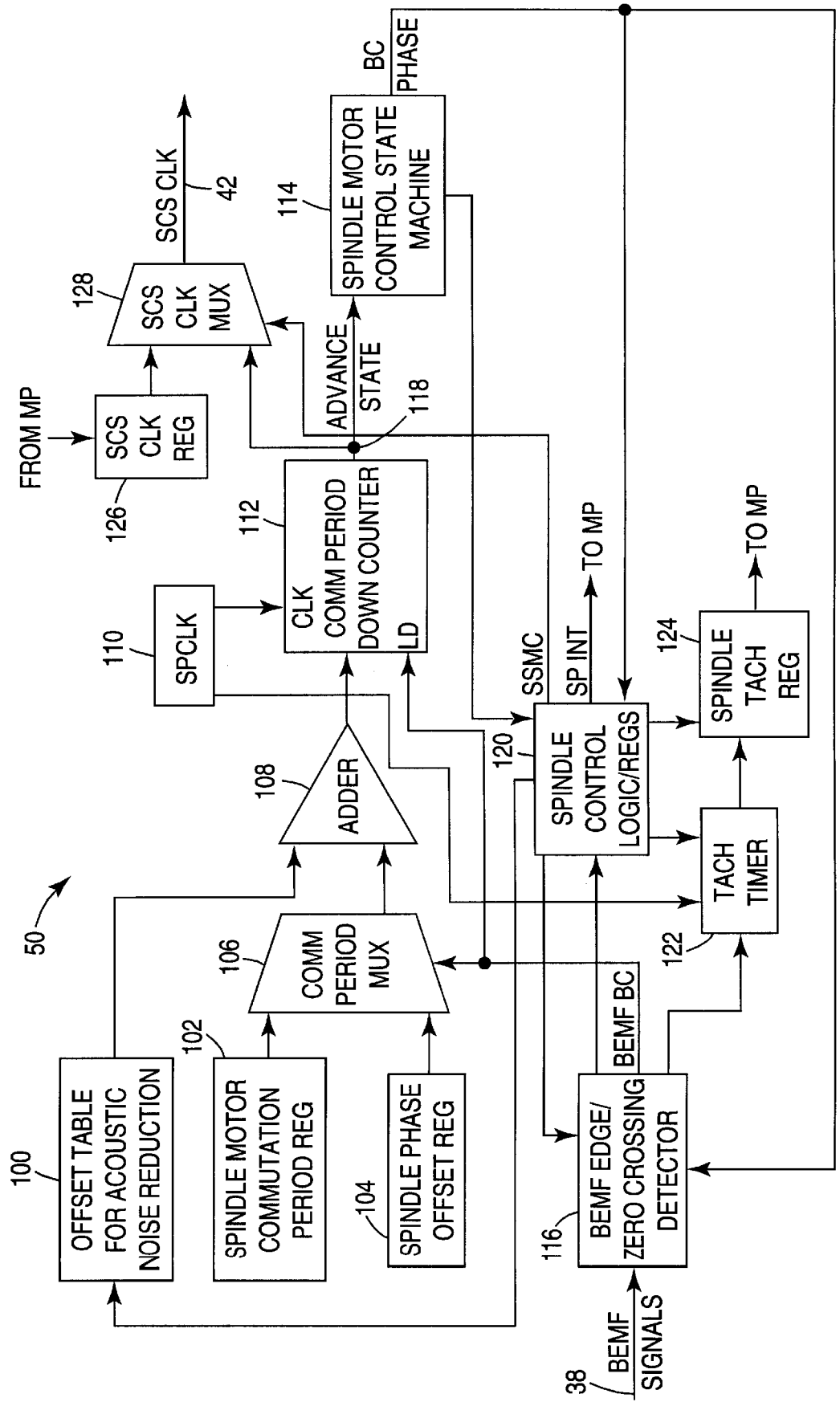
FIG. 4 is a more detailed block diagram of an embodiment of a spindle motor controller of the hard disk drive of FIG. 1.

Referring to FIG. 4, an example embodiment of spindle motor controller 50 is illustrated generally in block diagram form. Spindle motor controller 50 includes an offset table 100 for acoustic noise reduction. Offset table 100 provides multiple systematically introduced variations from the nominal commutation clock period that depends on the operating spin-rate of rotor 25. The accumulation of the variations within a series of the variations is substantially zero. For example, in one embodiment, each series of variations is over an integer multiple of an electrical cycle, such as one electrical cycle, of spindle motor 22. In this embodiment, multiple series of variations are over a mechanical revolution of rotor 25. The variations in each series preferably alternate between negative and positive polarity. The entries of offset table 100 for acoustic noise reduction each represent a corresponding variation.

As illustrated in FIG. 2A, the set of torque curves for spindle motor 22 represent the sequence of six commutation states for each electrical cycle of spindle motor 22. In the eight pole, three-phase spindle motor 22 embodiment, there are four electrical cycles in each mechanical revolution of spindle motor 22 (i.e., 24 commutation states per mechanical revolution of rotor 25). In this embodiment, there are 24 corresponding entries in offset table 100 which each represent a corresponding variation and the accumulation of the variations is substantially zero. In addition, there are four series of six variations over each mechanical revolution of rotor 25. Each of the series of six variations is over an electrical cycle of spindle motor 22, and the accumulation of the variations in each of the series of six variations is substantially zero.

The following description relates to the general operation of spindle motor controller 50 and the more specific operation of spindle motor controller 50 relative to using offset table 100 for acoustic noise reduction to systematically introduce variation from the nominal commutation clock period into the series of commutation clock pulses on SCSCLK line 42. Spindle motor controller 50 includes a spindle motor commutation period register 102, a spindle phase offset register 104, a commutation period multiplexor 106, an adder 108, a spindle clock generator 110, a commutation period down-counter 112, a spindle motor control state machine 114, and a BEMF edge zero crossing detector 116.

Spindle motor control state machine 114 stores the current state of spindle motor controller 50 which represents the current commutation state of commutation state sequencer 34. In the operation mode of disk drive 20, BEMF edge zero crossing detector 116 receives the BEMF signals on line 38 from BEMF detection circuit 35 and detects and qualifies the BEMF falling edge zero crossing transitions while spindle motor control state machine 114 is in the BC commutation state. Once BEMF edge zero crossing detector 116 detects the BEMF falling edge zero crossing transition during the BC commutation state, it activates a BEMF BC to a high logic level to control commutation period multiplexor 106 to select the output from spindle phase offset register 104 to be provided to a first input of adder 108. A second input of adder 108 is provided from the addressed offset table entry from offset table 100. Adder 108 adds the contents of spindle phase offset register 104 to the addressed offset table entry from offset table 100 and the combined value is loaded into commutation period down counter 112.

Spindle clock generator 110 provides a SPCLK clock input to commutation period down counter 112 and commutation period down counter 112 decrements its contents at every SPCLK clock pulse. When the commutation period down counter 112 count is decremented to zero, it reloads. However, at this point, the BEMF BC signal to multiplexer 106 is now a logic low level (i.e., spindle motor control state machine 114 is not in BC commutation state) so the commutation period multiplexer 106 selects the contents of spindle motor commutation period register 102 to be added by adder 108 to the addressed entry from offset table 100. Thus, when the commutation period down counter 112 count is decremented to zero, it is reloaded with the contents of spindle motor commutation period register 102 added to the addressed entry from offset table 100. For each of the five non-BC commutation states from spindle motor control state machine 114, the contents of spindle motor commutation period register 102 is added to the addressed entry from offset table 100 and loaded into commutation period down counter 112, which is decremented via the SPCLK clock signal from spindle clock generator 110. However, during each BC commutation state of spindle motor control state machine 114, once BEMF edge zero crossing detector 116 detects a BEMF falling edge zero crossing transition, the contents of the spindle phase offset register 104 are added to the addressed entry from offset table 100 and loaded into commutation period down counter 112.

Each time the commutation period down counter 112 count is decremented to zero its contents are reloaded and commutation period down counter 112 also activates an advance state signal on a line 118 which is provided to spindle motor control state machine 114 to advance the state held in spindle motor control state machine 114.

Spindle motor controller 50 also includes spindle control logic and registers 120, a tachometer timer 122, a spindle tachometer register 124, a spindle commutation state clock register 126, and a spindle commutation state (SCS) clock multiplexer 128. Spindle control logic and registers 120 perform various control functions for spindle controller 50, and for clarity only certain control lines from spindle control logic and registers 120 are illustrated in FIG. 4. When in the operation mode of disk drive 20, spindle control and registers 120 activate a spindle motor state machine control (SSMC) signal to control the SCS clock multiplexer 128 to select the advance state signal on line 118 as the SCSCLK clock on line 42 to be provided to commutation state sequencer 34.

When the SSMC signal is not activated during a non-operation mode of disk drive 20, such as during spin-up of disk drive 20 or an interrupt mode of disk drive 20, spindle controller 50 is controlled by microprocessor 44. When the SSMC signal is not activated, SCS clock multiplexer 128 selects the output of SCS clock register 126 as the SCSCLK signal on line 42 to be provided to commutation state sequencer 34. Microprocessor 44 writes to SCS clock register 126 via microprocessor data bus 52 to change the state of SCS clock register 126. SCS clock register 126 responds to this control from microprocessor 44 to provide a commutation clock to SCS clock multiplexer 128 which provides the commutation clock on SCSCLK line 42 to commutation state sequencer 34 while the SSMC signal is not active. In this way, microprocessor 44 can directly control commutation state sequencer 34 during non-operation modes of disk drive 20.

Under certain conditions in the operation mode of disk drive 20, spindle control logic and registers 120 also provides a spindle interrupt signal to microprocessor 44 to indicated to microprocessor 44 that it should take back control of spindle motor controller 50 to thereby directly control commutation state sequencer 34.

When entering the operation mode of disk drive 20, once rotor 25 reaches the operating spin-rate, microprocessor 44 transfers control of commutation state sequencer 34 to spindle motor controller 50. While spindle motor control state machine 114 indicates that commutation state sequencer 34 is in the BC commutation state, and BEMF edge zero crossing detector 116 indicates a falling BEMF zero crossing transition, spindle control logic and registers 120 interrupts microprocessor 44 after a programmable number of BEMF zero crossing transitions have occurred. In one embodiment, the default number of falling edge BEMF zero crossing transitions is 24 (i.e., 48 falling and rising edge transitions), which are the number of BEMF zero crossing transitions in one mechanical revolution of rotor 25. At each spindle interrupt occurring at each mechanical revolution of rotor 25, tachometer timer 122 provides a time interval between the last two spindle interrupts to spindle tachometer register 124. The output of spindle tachometer register 124 is then provided to microprocessor 44 to permit microprocessor 44 to determine the spin-rate of rotor 25 and to compare the determined rotor spin-rate to an expected rotor spin rate.

Tachometer timer 122 operates by counting the number of SPCLK pulses from spindle clock generator 110 that occur between the last two spindle interrupts. This information is provided to spindle tachometer register 124. Once the contents of tachometer timer 122 are stored in spindle tachometer register 124, tachometer timer 122 is suitably reset on the next SPCLK clock pulse from spindle clock generator 110.

In one embodiment, while under spindle motor controller 50 commutation control, if the spin-rate of rotor 25 drastically varies from the expected spin-rate, spindle control logic and registers 120 recognizes when no BEMF falling edge zero crossing transition occurs during the BC commutation state and sets an error and interrupts microprocessor 44. Microprocessor 44 then takes direct control of commutation state sequencer 34 to commutate spindle motor windings 24 to bring rotor 25 back to the desired operating spin-rate. Once the desired operating spin-rate is obtained, microprocessor 44 again transfers commutation control to spindle motor controller 50.

In one embodiment, if the rotor 25 spin-rate varies during spindle motor controller 50 commutation control, yet a BEMF falling edge zero crossing transition is detected by BEMF edge detector during the BC commutation state, then spindle motor controller 50 continues normal status. During this normal status, spindle control logic and registers 120 interrupt microprocessor 44 after a programmable number of BEMF falling edge zero transitions are detected in the BC commutation state. Microprocessor 44 responds to the spindle interrupt to determine the spin-rate of rotor 25 from the output of spindle tachometer register 124. If the actual spin-rate is outside of an expected range, microprocessor 44 places spindle motor controller 50 in an error recovery mode. Microprocessor 44 then directly commutates commutation state sequencer 34 to again achieve the desired operating spin-rate of rotor 25, after which spindle motor commutation control is transferred to spindle motor controller 50.

In one embodiment, the most significant bit (MSB) or other designated bit of each of the entries in offset table 100 for acoustic noise reduction indicates the polarity of the corresponding entry value. The entries in offset table 100 preferably alternate between negative and positive polarity so that each variation in each series of variations for each electrical cycle alternate between negative and positive polarity to substantially maintain peak positive torque in spindle motor 22. By alternating the variations in each series between negative and positive polarity, the spin-rate variations in rotor 25 are minimized.

Spindle motor control state machine 114 provides a current commutation state to spindle control logic and registers 120. Spindle control logic and registers 120 correspondingly provide an address to offset table 100 for acoustic noise reduction to select the entry to be provided from the offset table for acoustic noise reduction. As described above, in one embodiment offset table 100 has four series of variations where each series of variations includes six variation. Thus, spindle control logic and registers 120 provide addresses for each of the 24 entries on each state transition indicated by spindle motor control state machine 114 with a corresponding BEMF falling edge zero crossing transition detection by BEMF edge zero crossing detector 116. The addresses are reset after each mechanical revolution of rotor 25. In alternative embodiments of offset table 100, there are more than one mechanical revolution of entries in offset table 100, such as 96 entries corresponding to four mechanical revolutions of rotor 25.

In an alternative embodiment, the offset table 100 for acoustic noise reduction is stored in RAM 48 and is addressed by microprocessor 44. In this embodiment, the contents of the offset table in RAM 48 are provided to adder 108 via microprocessor data bus 52.

Figure 5:
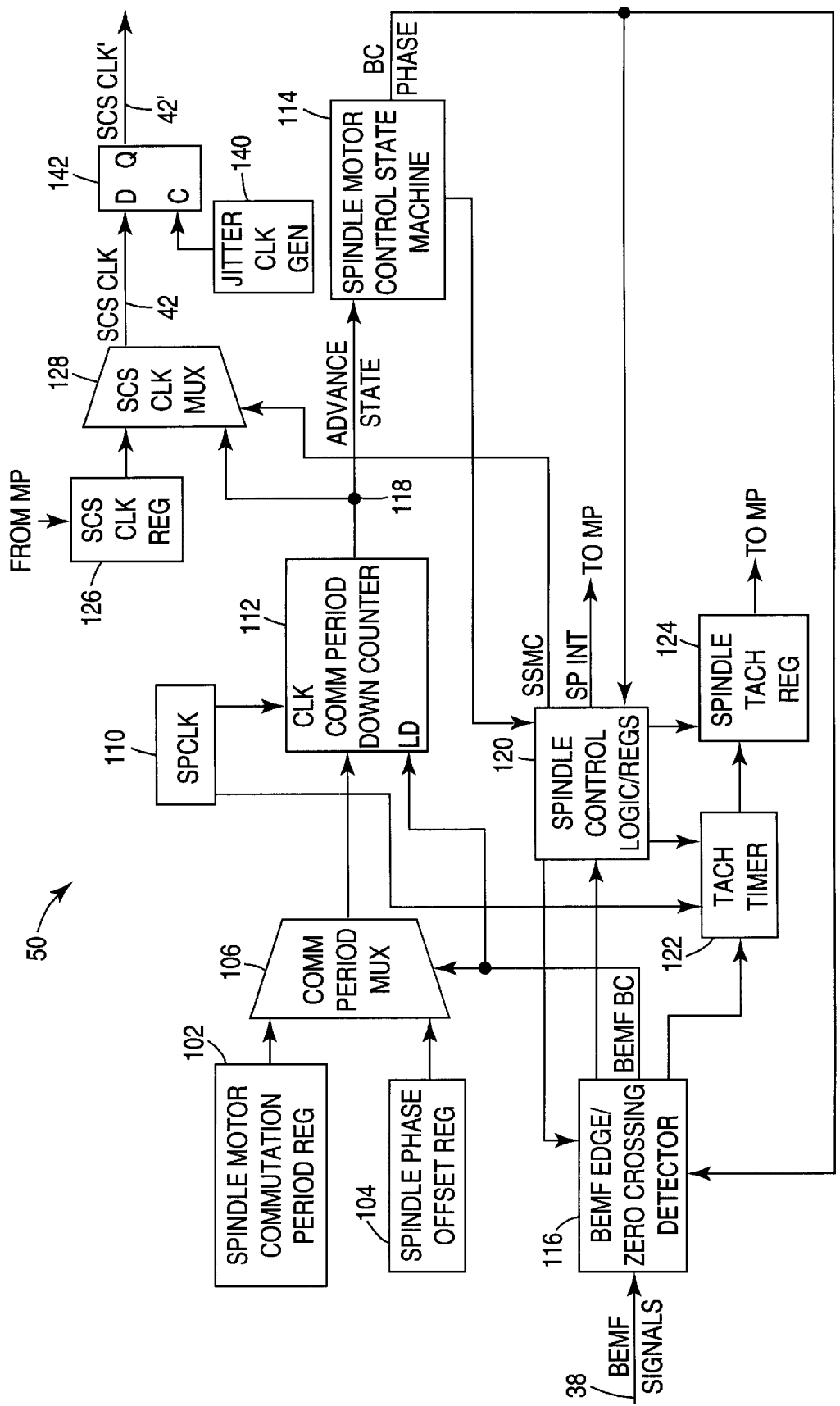
FIG. 5 is a more detailed block diagram of an alternative embodiment of a spindle motor controller of the hard disk drive of FIG. 1.

Referring to FIG. 5, an alternative embodiment for a suitable spindle motor controller 50 of FIG. 1 is illustrated generally at 50' in FIG. 5. Spindle motor controller 50' of FIG. 5 is similar to spindle motor controller 50 of FIG. 4 and like elements are indicated with like reference numbers and the operation of the these elements is described in reference to spindle motor controller 50 of FIG. 4. However, offset table 100 for acoustic noise reduction is not included in spindle motor controller 50' of FIG. 5, instead spindle motor controller 50' includes a hardware (i.e., not firmware) solution including a jitter clock generator 140 and a flip-flop register 142.

In this embodiment, the series of commutation clock pulses on SCSCLK line 42 are provided from SCS clock multiplexer 128 with no systematically introduced variation from the nominal commutation clock period during the operation mode of disk drive 20. However, flip-flop register 142 receives the SCSCLK signal on line 42 at its data input and a fixed frequency clock generated by jitter clock generator 140 at its clock input. The fixed frequency clock from jitter clock generator 140 is asynchronous to the SCSCLK clock signal on line 42. Flip-flop register 142 provides a SCSCLK' signal 42' which is jittered by +/−½ cycle of the fixed frequency clock period provided from jitter clock generator 140. In this embodiment, jitter clock generator 140 provides the systematically introduced variation from the nominal commutation clock period by adding +/−½ cycle of the its fixed frequency clock period on each rising and falling edge of the SCSCLK' signal on line 42'. The SCSCLK' signal on line 42' is then provided to commutation state sequencer 34 to advance commutation state sequencer 34 from a present commutation state to a next commutation state.

In an illustrative example embodiment of spindle motor controller 50', the SCSCLK signal on line 42 is 2,160 Hz for a 5400 revolution per minute (RPM) spindle motor 20 because there are 24×5400=129,600 commutations per minute or 2160 commutations per second. In this example embodiment a 108 KHz clock asynchronous to the SCSCLK signal on line 42 provides an approximately +/− one percent systematically introduced variation from the nominal commutation clock period. Other suitable embodiments of spindle motor controllers 50 and 50' provide approximately +/− six to twelve percent systematically introduced variation from the nominal commutation clock period.

We claim:

1. A disk drive that incidentally generates undesirable acoustic noise during an operation mode, the disk drive comprising:

a spindle motor having a plurality of windings and a rotor rotatable at an operating spin-rate during the operation mode of the disk drive;

switching elements;

a commutation state sequencer including a sequence of commutation states for generating a sequence of control signals, the sequence of commutation states including a present commutation state and a next commutation state;

the switching elements being responsive to the sequence of control signals for sequentially applying a voltage across a selected combination of the windings to generate a torque on the rotor in order to maintain the operating spin-rate;

a spindle motor control system for providing a series of commutation clock pulses to advance the commutation state sequencer from the present commutation state to the next commutation state, the series of commutation clock pulses having a corresponding series of commutation clock periods, at least two of the commutation clock periods each having a systematically introduced variation from a nominal commutation clock period that depends on the operating spin-rate; and whereby the systematically introduced variation for each of the at least two commutation clock periods reduces the acoustic noise in the disk drive.

2. The disk drive of claim 1 wherein the spindle motor control system comprises:

means for providing multiple systematically introduced variations in commutation periods, the accumulation of the variations within a series of the variations being substantially zero; and means for varying each of the at least two commutation clock periods by a selected one of the variations.

3. The disk drive of claim 2 wherein each series of variations is over an integer multiple of an electrical cycle of the spindle motor.

4. The disk drive of claim 2 wherein multiple series of variations are over an integer multiple of a mechanical revolution of the rotor.

5. The disk drive of claim 2 wherein the variations in each series alternate between negative and positive polarity.

6. The disk drive of claim 2 wherein the means for providing the multiple variations includes an offset table, having entries which in each represent a corresponding variation.

7. The disk drive of claim 1 wherein the rotor induces bemf across the windings, and the spindle motor control system includes means responsive to the bemf in the windings for controlling the voltage applied across the windings in order to maintain the operating spin-rate of the rotor, wherein the spindle motor control system monitors the time period between bemf zero crossings to determine speed error that is used for controlling the voltage applied across the windings which compensates for the speed error, wherein the time period between bemf zero crossings is monitored once per mechanical revolution of the rotor, and wherein the systematically introduced variation is within speed error tolerance for each mechanical revolution.

8. The disk drive of claim 1 wherein the rotor induces bemf across the windings, the spindle motor control system includes means responsive to the bemf in the windings for adjusting the time for providing the series of commutation clock pulses to the commutation state sequencer.

9. The disk drive of claim 1 wherein the spindle motor control system comprises:

nominal commutation clock circuitry for generating a pre-series of commutation clock pulses having the nominal commutation clock period;

a jitter clock generator for generating a fixed frequency clock which is asynchronous to the pre-series of commutation clock pulses having the nominal commutation clock period; and a flip-flop register having a data input, a clock input, and data output, wherein the clock input is coupled to the fixed frequency clock, the data input is coupled to the pre-series of commutation clock pulses having the nominal commutation clock period, and the data output provides the series of commutation clock pulses to advance the commutation state sequencer.

10. A method of reducing acoustic noise in a disk drive that incidentally generates undesirable acoustic noise during an operation mode, the disk drive including a spindle motor having a plurality of windings and a rotor rotatable at an operating spin-rate during the operation mode of the disk drive; and a spindle motor driver having switching elements, the method comprising the steps of:

providing a sequence of commutation states for generating a sequence of control signals, the sequence of commutation states including a present commutation state and a next commutation state;

controlling the switching elements with the sequence of control signals to sequentially apply a voltage across a selected combination of the windings to generate a torque on the rotor in order to maintain the operating spin-rate;

providing a series of commutation clock pulses to advance the sequence of commutation states from the present commutation state to the next commutation state, the series of commutation clock pulses having a corresponding series of commutation clock periods; and systematically introducing variation from a nominal commutation clock period that depends on the operating spin-rate into each of at least two of the commutation clock periods to reduce the acoustic noise in the disk drive.

11. The method of claim 10 further comprising the steps of:

providing multiple systematically introduced variations in commutation periods, the accumulation of the variations within a series of the variations being substantially zero; and varying each of the at least two commutation clock periods by a selected one of the variations.

12. The method of claim 11 wherein each series of variations is over an integer multiple of an electrical cycle of the spindle motor.

13. The method of claim 11 wherein multiple series of variations are over an integer multiple of a mechanical revolution of the rotor.

14. The method of claim 11 wherein the variations in each series alternate between negative and positive polarity.

15. The method of claim 10 wherein the rotor induces bemf across the windings, and the method further comprises the steps of:

controlling the voltage applied across the windings in order to maintain the operating spin-rate of the rotor in response to the bemf in the windings;

monitoring the time period between bemf zero crossings to determine speed error that is used for controlling the voltage applied across the windings which compensates for the speed error; and wherein the time period between bemf zero crossings is monitored once per mechanical revolution of the rotor wherein the percentage of systematically introduced variations is within speed error tolerance for each mechanical revolution.

16. The method of claim 10 wherein the rotor induces bemf across the windings, and the method further comprises the step of:

adjusting the time for providing the series of commutation clock pulses to the commutation state sequence in response to the bemf in the windings.

* * * * *